(12) United States Patent
Pelletier et al.

(10) Patent No.: US 9,036,617 B2
(45) Date of Patent: *May 19, 2015

(54) METHOD AND APPARATUS FOR RADIO LINK SYNCHRONIZATION AND POWER CONTROL IN CELL_FACH AND IDLE MODE

(71) Applicant: InterDigital Patent Holdings, Inc., Wilmington, DE (US)

(72) Inventors: Benoit Pelletier, Roxboro (CA); Paul Marinier, Brossard (CA); Christopher R. Cave, Montreal (CA); In H. Kim, Norristown, PA (US); Rocco DiGirolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,643

(22) Filed: Nov. 26, 2013

(65) Prior Publication Data

US 2014/0086047 A1 Mar. 27, 2014

Related U.S. Application Data

(63) Continuation of application No. 12/346,617, filed on Dec. 30, 2008, now Pat. No. 8,615,002.

(60) Provisional application No. 61/018,059, filed on Dec. 31, 2007, provisional application No. 61/025,695, filed on Feb. 1, 2008.

(51) Int. Cl.
*H04J 3/06* (2006.01)
*G08C 17/00* (2006.01)
(Continued)

(52) U.S. Cl.
CPC .............. *H04L 47/12* (2013.01); *H04W 52/50* (2013.01); *H04W 56/0085* (2013.01); *H04W 56/0005* (2013.01)

(58) Field of Classification Search
None
See application file for complete search history.

(56) References Cited

U.S. PATENT DOCUMENTS

| | | |
|---|---|---|
| 2002/0089957 A1 | 7/2002 | Viero |
| 2003/0139170 A1 | 7/2003 | Heo et al. |

(Continued)

FOREIGN PATENT DOCUMENTS

| | | |
|---|---|---|
| EP | 1443667 A2 | 8/2004 |
| WO | 2006/117629 | 11/2006 |

(Continued)

OTHER PUBLICATIONS

Third Generation Partnership Project, "Technical Specification Group Radio Access Network; Physical layer procedures (FDD) (Release 7)," 3GPP TS 25.214 V7.0.0, Figures 3, B.1 and B.2 and Sections 6.1, 6B.1, 7 and B.1, pp. 30-33, 41-44, and 53-54 (Mar. 2006).

(Continued)

*Primary Examiner* — Faruk Hamza
*Assistant Examiner* — Diane Lo
(74) *Attorney, Agent, or Firm* — Volpe and Koenig, P.C.

(57) ABSTRACT

A method and apparatus for radio link synchronization and power control in CELL_FACH state and idle mode are disclosed. A wireless transmit/receive unit (WTRU) transmits a random access channel (RACH) preamble and receives an acquisition indicator acknowledging the RACH preamble via an acquisition indicator channel (AICH) and an index to an enhanced dedicated channel (E-DCH) resource. The WTRU determines a start of an E-DCH frame. An F-DPCH timing offset is defined with respect to one of the RACH access slot and an AICH access slot carrying the acquisition indicator. A relative F-DPCH timing offset may be signaled to the WTRU and the WTRU may determine a start of an E-DCH frame based on the relative F-DPCH timing offset and timing of an AICH access slot including the acquisition indicator. The WTRU may transmit a dedicated physical control channel (DPCCH) power control preamble before starting an E-DCH transmission.

24 Claims, 5 Drawing Sheets

(51) Int. Cl.
H04W 4/00 (2009.01)
H04B 7/216 (2006.01)
H04L 12/801 (2013.01)
H04W 52/50 (2009.01)
H04W 56/00 (2009.01)

(56) References Cited

U.S. PATENT DOCUMENTS

| | | | |
|---|---|---|---|
| 2005/0281222 | A1 | 12/2005 | Ranta-Aho et al. |
| 2006/0285521 | A1 | 12/2006 | Steudle |
| 2007/0140162 | A1 | 6/2007 | Taylor |
| 2007/0206531 | A1 | 9/2007 | Pajukoski et al. |
| 2008/0192766 | A1 | 8/2008 | Ranta-Aho et al. |
| 2009/0124266 | A1 | 5/2009 | Carlson et al. |
| 2009/0168750 | A1 | 7/2009 | Pelletier et al. |
| 2009/0225709 | A1 | 9/2009 | Wager et al. |
| 2010/0215005 | A1 | 8/2010 | Pradas et al. |
| 2011/0098077 | A1 | 4/2011 | Gholmieh et al. |

FOREIGN PATENT DOCUMENTS

| | | |
|---|---|---|
| WO | 2006/118426 | 11/2006 |
| WO | 2007/073040 | 6/2007 |
| WO | 2007129180 A2 | 11/2007 |

OTHER PUBLICATIONS

Ericsson, "E_DCH Starting Time in Enhanced CELL_FACH", 3GPP TSG_RAN2 Meeting #58bis, R2-072936, (Sevilla, Spain, Jan. 14-18, 2008).
MCC Support, "Draft Report of 3GPP TSG RAN WG1 #51 v1.0.0 (Jeju, South Korea, Nov. 5-9, 2007)", 3GPP TSG RAN WG1 Meeting #51b, R1-080002, (Sevilla, Spain, Jan. 14-18, 2008).
Nokia et al., "Enhanced CELL_FACH State with E-DCH," 3GPP TSG-RAN WG2 Meeting #59bis, R1-074300 (Oct. 8-12, 2007).
Nokia Siemens Networks et al, "Introduction of the Enhanced Uplink for CELL_FACH State", Change Request, 25.211, CR 0256, Rev 2, Current Version 8.1.0, 3Gpp TSG-RAN WG1 Meeting #54, R1-083441, (Jeju, South Korea, Aug. 18-22, 2008).
Philips, "Resource allocation for E-DCH in CELL_FACH," 3GPP TSG RAN WG1 Meeting #51, R1-074625 (Nov. 5-9, 2007).
Qualcomm Europe, "Clarification on E-DCH timing," 3GPP TSG-RAN WG1 #41, R1-050427 (May 10-14, 2005).
Third Generation Partnership Project, "Technical Specification Group Radio Access Network; Physical Channels and Mapping of Transport Channels onto Physical Channels (FDD) (Release 7)," 3GPP TS 25.211 V7.6.0 (May 2008).
Third Generation Partnership Project, "Technical Specification Group Radio Access Network; Physical Channels and Mapping of Transport Channels onto Physical Channels (FDD) (Release 8)," 3GPP TS 25.211 V8.3.0 (Dec. 2008).
Third Generation Partnership Project, "Technical Specification Group Radio Access Network; Physical Layer Procedures (FDD) (Release 7)." 3GPP TS 25.214 V7.5.0 (May 2007).
Third Generation Partnership Project, "Technical Specification Group Radio Access Network; Physical Layer Procedures (FDD) (Release 7)." 3GPP TS 25.214 V7.7.0 (Nov. 2007).
Third Generation Partnership Project, "Technical Specification Group Radio Access Network; Physical Layer Procedures (FDD) (Release 7)." 3GPP TS 25.214 V7.10.0 (Dec. 2008).
Third Generation Partnership Project, "Technical Specification Group Radio Access Network; Physical Layer Procedures (FDD) (Release 8)." 3GPP TS 25.214 V8.0.0 (Nov. 2007).
Third Generation Partnership Project, "Technical Specification Group Radio Access Network; Physical Layer Procedures (FDD) (Release 8)." 3GPP TS 25.214 V8.4.0 (Dec. 2008).
Third Generation Partnership Project, "Technical Specification Group Radio Access Network; User Equipment (UE) radio transmission and reception (FDD) (Release 7)", 3GPP TS 25.101 V7.9.0 (Sep. 2007).
Third Generation Partnership Project, "Technical Specification Group Radio Access Network; User Equipment (UE) radio transmission and reception (FDD) (Release 7)", 3GPP TS 25.101 V7.10.0 (Dec. 2007).
Third Generation Partnership Project, "Technical Specification Group Radio Access Network; User Equipment (UE) radio transmission and reception (FDD) (Release 7)", 3GPP TS 25.101 V7.14.0 (Dec. 2008).
Third Generation Partnership Project, "Technical Specification Group Radio Access Network; User Equipment (UE) radio transmission and reception (FDD) (Release 8)", 3GPP TS 25.101 V8.1.0 (Dec. 2007).
Third Generation Partnership Project, "Technical Specification Group Radio Access Network; User Equipment (UE) radio transmission and reception (FDD) (Release 8)", 3GPP TS 25.101 V8.4.0 (Sep. 2008).
Third Generation Partnership Project, "Technical Specification Group Radio Access Network; User Equipment (UE) radio transmission and reception (FDD) (Release 7)", 3GPP TS 25.311 V7.10.0 (Sep. 2009).
Third Generation Partnership Project, "Technical Specification Group Radio Access Network; User Equipment (UE) radio transmission and reception (FDD) (Release 7)", 3GPP TS 25.311 V7.6.0 (Sep. 2007).
Third Generation Partnership Project, "Technical Specification Group Radio Access Network; Radio Resource Control (RRC); Protocol Specification," 3GPP TS 25.331 V8.0.0 (Sep. 2007).
Third Generation Partnership Project, "Technical Specification Group Radio Access Network; Radio Resource Control (RRC); Protocol Specification," 3GPP TS 25.331 V8.4.0 (Sep. 2008).
Third Generation Partnership Project, "Technical Specification Group Radio Access Network; Physical layer procedures (FDD) (Release 6)," 3GPP TS 25.214 V6.11.0 (Dec. 2006).
Third Generation Partnership Project, "Technical Specification Group Radio Access Network; Radio Resource Control (RRC); Protocol Specification (Release 6)," 3GPP TS 25.331 V6.20.0 (Dec. 2008).
Third Generation Partnership Project, "Technical Specification Group Radio Access Network; Radio Resource Control (RCC); Protocol Specification (Release 6)," 3GPP TS 25.331 V6.15.0 (Sep. 2007).
Third Generation Partnership Project, "Technical Specification Group Radio Access Network; Physical channels and mapping of transport channels onto physical channels (FDD) (Release 6)," 3GPP TS 25.211 V6.9.0 (Nov. 2007).
Third Generation Partnership Project, "Technical Specification Group Radio Access Network; Physical channels and mapping of transport channels onto physical channels (FDD) (Release 7)," 3GPP TS 25.211 V7.4.0 (Nov. 2007).
Third Generation Partnership Project, "Technical Specification Group Radio Access Network; Medium Access Control (MAC) protocol specification (Release 6)," 3GPP TS 25.321 V6.17.0 (Dec. 2008).
Third Generation Partnership Project, "Technical Specification Group Radio Access Network; Medium Access Control (MAC) protocol specification (Release 6)," 3GPP TS 25.321 V6.14.0 (Sep. 2007).
Third Generation Partnership Project, "Technical Specification Group Radio Access Network; Medium Access Control (MAC) protocol specification (Release 7)," 3GPP TS 25.321 V7.6.0 (Sep. 2007).
Third Generation Partnership Project, "Technical Specification Group Radio Access Network; Medium Access Control (MAC) protocol specification (Release 7)," 3GPP TS 25.321 V7.10.0 (Sep. 2008).
Third Generation Partnership Project, "Technical Specification Group Radio Access Network; Medium Access Control (MAC) protocol specification (Release 8)," 3GPP TS 25.321 V8.3.0 (Sep. 2008).
European Telecommunications Standards Institute, "Universal Mobile Telecommunications System (UMTS); Physical channels and mapping of transport channels onto physical channels (FDD) (3GPP TS 25.211 version 7.3.0 Release 7)," EISI TS 125 211 V 7.3.0 (Oct. 2007).
Nokia et al., "Resource assignment for E-DCH access in CELL_FACH state," 3GPP TSG-RAN WG1 Meeting #50-BIS, R1-074303, Shanghai, China (Oct. 8-12, 2007).

NOTE: ALL OFFSETS IN MULTIPLE OF 256 CHIPS

METHOD AND APPARATUS FOR RADIO LINK SYNCHRONIZATION AND POWER CONTROL IN CELL_FACH AND IDLE MODE

CROSS REFERENCE TO RELATED APPLICATIONS

This application is a continuation of U.S. patent application Ser. No. 12/346,617, filed Dec. 30, 2008, which claims the benefit of U.S. Provisional Application Ser. Nos. 61/018,059 filed Dec. 31, 2007 and 61/025,695 filed Feb. 1, 2008, which are incorporated by reference as if fully set forth.

FIELD OF INVENTION

This application is related to wireless communications.

BACKGROUND

The evolution of high speed packet access (HSPA) is being considered for higher throughput and lower latencies. Due to the increase of data services, in particular internet services such as web browsing, where high data rates are requested for short periods of time, the third generation partnership project (3GPP) Release 99 (R99) mechanism of transitioning wireless transmit/receive units (WTRUs) in CELL_FACH to CELL_DCH requires significant network resources and adds latency to the services. To support these types of services in CELL_FACH, it has been proposed that the WTRUs are allowed to use the enhanced dedicated channel (E-DCH) with shared resources without transitioning to CELL_DCH, which is referred to as "enhanced random access channel (E-RACH) access" or "E-DCH in CELL_FACH state and Idle mode".

An E-RACH access is a combination of a random access channel (RACH) preamble transmission phase and an E-DCH transmission phase. FIG. 1 shows an E-RACH access procedure. The RACH preamble transmission phase uses a subset of R99 RACH signatures that a Node B has designated or broadcasted for use in E-RACH. The reception of a preamble by the Node B is acknowledged in an acquisition indication channel (AICH), which also assigns a WTRU with an index for a shared E-DCH resource to use. The shared E-DCH resources are pre-designated by the Node B for use in an E-RACH access in CELL_FACH. For all shared E-DCH resources, the parameters are provided to the WTRU during initial setup or broadcast to WTRUs in the cell by the Node B. Each E-DCH resource is associated with an index which is transmitted as part of the acknowledgement for the E-RACH access, or using some other signaling mechanism.

Once the WTRU receives the index value, all configuration parameters related to the assigned shared E-DCH resource are known and the WTRU does not need to communicate with the Node B in the same way as in R99. Indeed, in E-RACH, the E-DCH is used for the message transmission instead of the regular R99 10 or 20 ms physical random access channel (PRACH) message part.

The E-RACH access eliminates the overhead associated with the conventional CELL_FACH to CELL_DCH transition. The shared E-DCH resource is released upon completion of data transfer and the WTRU remains in CELL_FACH so that other WTRUs could use the shared E-RACH resources. Thus, a significant reduction in transition latency is achieved and it eliminates transition back to CELL_FACH with re-initialization when CELL_DCH is terminated. The WTRU may request permanent transition to CELL_DCH directly from E-RACH access.

The conventional RACH access starts with preamble transmission of one randomly selected PRACH signature out of a set of up to 16 signatures, with a preconfigured initial power level. If no response is received on the associated AICH from the Node B, the WTRU selects the next available access slot, increases power by a predefined amount and transmits a new randomly selected signature from the set of available signatures. If the maximum number of preamble transmissions is exceeded or negative acknowledgement (NACK) is received, the WTRU exits the PRACH access procedure and reports it to a higher layer, (i.e. medium access control (MAC)).

If a positive acknowledgement (ACK) response is received from the Node B, the WTRU transmits a RACH message three or four uplink access slots after the uplink access slot of the last transmitted RACH preamble. FIG. 2 shows timing relationship between RACH access slots and AICH access slots. The RACH access slot precedes the corresponding AICH access slot by $\tau_{p-a}$. For instance, if the WTRU transmits a preamble on PRACH access slot #2, the WTRU may get an ACK response on AICH access slot #2, and the WTRU may begin transmission of the RACH message on PRACH access slot #5 or #6, depending on the WTRU capabilities.

3GPP Release 8 (R8) E-RACH access during CELL_FACH starts with RACH preamble transmission followed by shared E-DCH transmission when an E-DCH resource is assigned by the Node B as shown in FIG. 1. A NACK or no response from the Node B requires the WTRU to transmit again in the next available access slot until the maximum number of attempts has been exhausted. The Node B responds to the RACH preamble via an AICH as in R99. The timing of the start of the E-DCH transmission has been agreed as a fixed time offset relative to the fractional dedicated physical channel (F-DPCH) frame timing (same as regular E-DCH). The F-DPCH timing offset, expressed by the variable $\tau_{F\text{-}DPCH,p}$, is set by the network and may be different for different F-DPCHs, but the offset from the P-CCPCH frame timing is always a multiple of 256 chips. FIG. 3 shows the radio frame timing and access slot timing of downlink physical channels. FIG. 4 shows the downlink and uplink timing relationship between primary common control physical channel (P-CCPCH), AICH, F-DPCH, dedicated physical control channel (DPCCH) and E-DCH.

One of the issues associated to the use of E-DCH in CELL_FACH state and Idle mode resides in determining the F-DPCH frame timing. In the conventional systems, the F-DPCH frame timing is signaled explicitly by the network when the WTRU is transitioned to CELL_DCH. The F-DPCH frame dictates the beginning of the DPCCH preamble transmission, which essentially determines the start of the uplink scrambling code sequence. Since it is difficult to initialize the scrambling code in the middle of a frame, it is typically necessary for the WTRU to start uplink transmission after crossing the frame boundary at least once.

Fixing the F-DPCH frame timing to the P-CCPCH, as it is currently done in CELL_DCH, may cause difficulties with E-DCH in CELL_FACH. Indeed, it may lead to a possibility of power control update being delayed by as much as a full frame (10 ms). To illustrate, consider an E-RACH preamble transmitted in an access slot near the end of an uplink E-DCH frame, as would be defined by the E-DCH shared resource F-DPCH frame timing (with respect to the fixed P-CCPCH). Assuming an ACK is transmitted over the AICH, this ACK response will be received at the end of the uplink E-DCH frame or at the beginning of the next uplink E-DCH frame so that the WTRU may not have an opportunity to transmit (due to the need to initialize the scrambling code) until the beginning of the next E-DCH frame. This will result in a long delay before the power control loop can be established, essentially making the first power control update nearly a full frame, (i.e., 10 ms), after the last RACH preamble transmission. This may cause power control loop stabilization problem. It may also result in additional latency for sending the RACH message part. Thus, for a given F-DPCH offset relative to the P-CCPCH, some access slots will be more advantageous than others for E-RACH access, and some access slots may not be preferable due to power control update latency.

SUMMARY

A method and apparatus for radio link synchronization and power control in CELL_FACH state and idle mode are disclosed. A WTRU transmits an RACH preamble and receives an acquisition indicator acknowledging the RACH preamble via an AICH and an index to an E-DCH resource. The WTRU determines a start of an E-DCH frame. An F-DPCH timing offset is defined with respect to one of the RACH access slot and an AICH access slot carrying the acquisition indicator. A relative F-DPCH timing offset may be signaled to the WTRU and the WTRU may determine a start of an E-DCH frame based on the relative F-DPCH timing offset and timing of an AICH access slot including the acquisition indicator. The WTRU may transmit a DPCCH power control preamble before starting an E-DCH transmission.

BRIEF DESCRIPTION OF THE DRAWINGS

A more detailed understanding may be had from the following description, given by way of example in conjunction with the accompanying drawings wherein.

DETAILED DESCRIPTION

Figure 1:
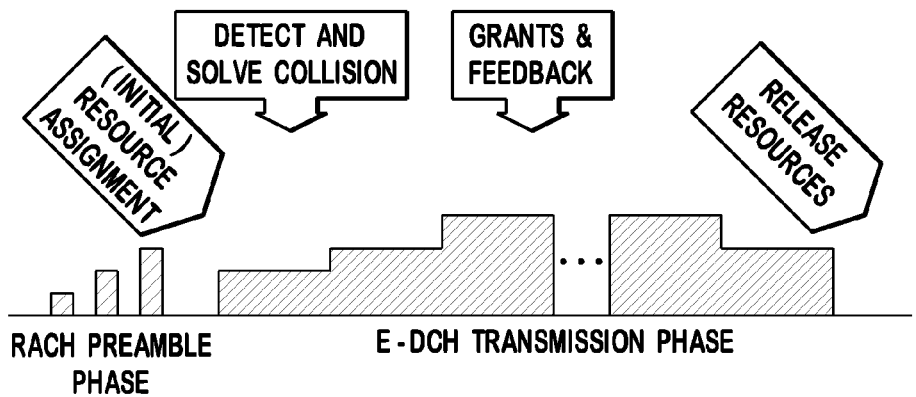
FIG. 1 shows an E-RACH access procedure.
Figure 2:
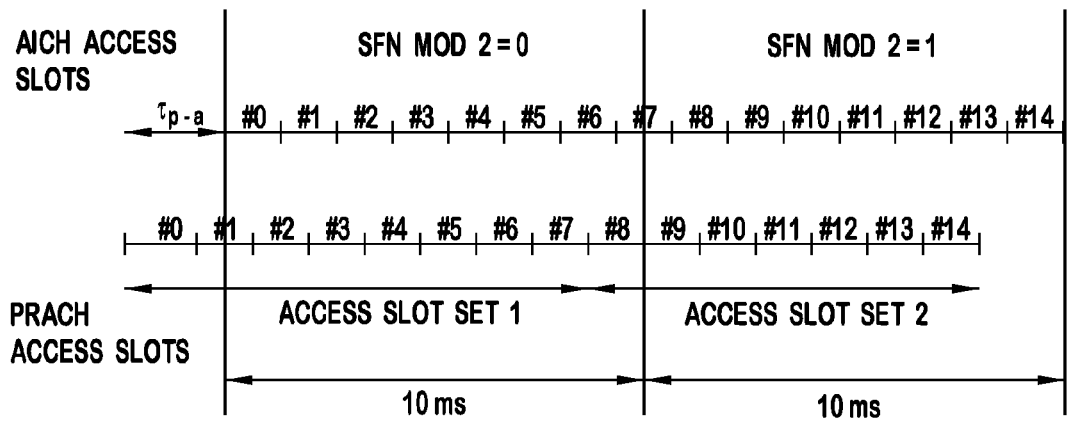
FIG. 2 shows timing relationship between RACH access slots and AICH access slots.
Figure 3:
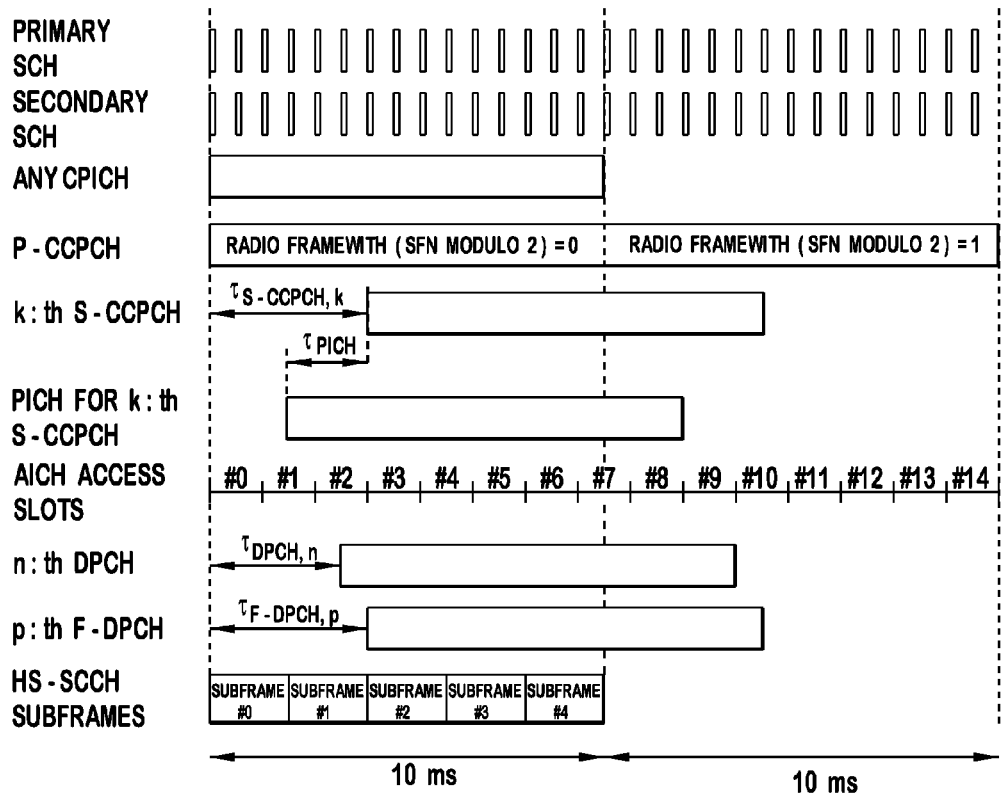
FIG. 3 shows the radio frame timing and access slot timing of downlink physical channels.
Figure 4:
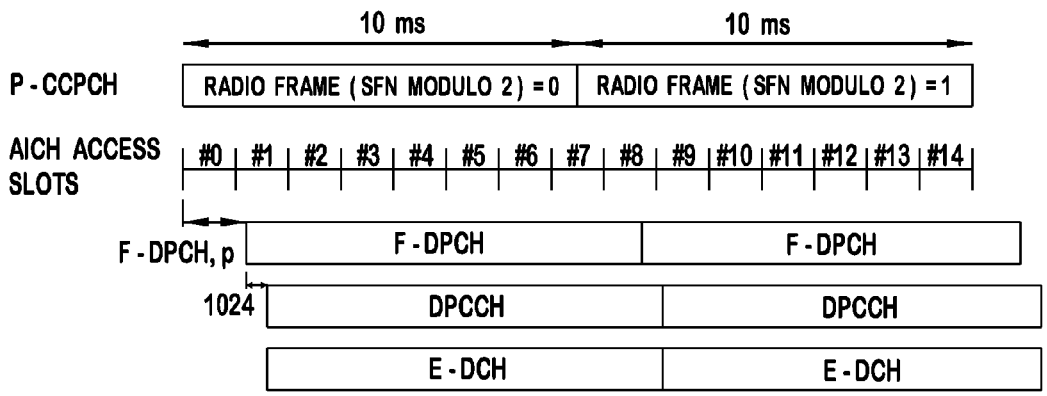
FIG. 4 shows the downlink and uplink timing relationship between P-CCPCH, AICH, F-DPCH, DPCCH and E-DCH.

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

The embodiments are applicable to R8 and beyond of the 3GPP wideband code division multiple access (WCMDA) standards where E-RACH is used to provide access to shared E-DCH resources during CELL_FACH state or idle mode without a need for full scale switch over to CELL_DCH as in previous releases. It should be noted that the embodiments disclosed herein may be extended to any wireless systems other than WCDMA or 3GPP R8.

In accordance with a first embodiment, the power level for E-DCH transmission followed by successful RACH preamble transmission is controlled with $P_{p-m}$ offset using an open loop power control scheme similar to R99. The power offset $P_{p-m}$ measured in dB is an offset between the power of the last successfully transmitted RACH preamble and the control part of the random access message. The power offset $P_{p-m}$ is modified based on the time to the next E-DCH frame boundary. The measured power level during RACH preamble transmission may be adjusted higher when the E-DCH transmission slot is further away from the last RACH preamble transmission. The adjustment function may be linear, parabolic or dB increments to account for the uncertainty.

In accordance with a second embodiment, the PRACH access slots are limited so that the selected E-RACH preamble slot assures the E-DCH transmission to be near the uplink frame boundary. The E-RACH preamble transmission may be restricted to E-DCH frame center. For example, for the particular case of a zero F-DPCH offset, the PRACH access slots may be limited to access slots 4, 5, 6, 11, 12, 13, and 14 as allowable slots for E-RACH preamble transmissions.

The E-RACH preamble transmission may be allocated per RACH sub-channel as specified in 3GPP TS 25.214 v7.5.0 and provided here in Table 1. A RACH sub-channel defines a sub-set of the total set of RACH access slots. There are a total of 12 RACH sub-channels as shown in Table 1. Based on the uplink and downlink timing relationship and E-DCH frame boundary, appropriate row may be selected in Table 1 for the RACH preamble transmission. The access slots may be limited based on the value of $\tau_{F\text{-}DPCH,p}$ since $\tau_{F\text{-}DPCH,p}$ may be used to calculate E-DCH frame boundary.

TABLE 1

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

In accordance with a third embodiment, because certain access slots are more favorable to R8 E-RACH access, given the F-DPCH time offset ($\tau_{F\text{-}DPCH,p}$), a subset of access slots is allocated for R8 WTRUs and remaining slots are allocated for R99 WTRUs. For example, half the access slots that are favorable to R8 E-RACH access may be assigned to R8 WTRUs while the rest of access slots may be assigned to R99 WTRUs.

The access slot assignment may be dynamic. The access slots reserved for R99 and R8 E-RACH accesses may be configured by the network so that when R99 WTRUs are prominent, more access slots may be assigned for R99 RACH access and when R8 WTRUs with E-RACH access capability become prominent, more access slots may be assigned for R8 E-RACH access. The exact division of access slots may be determined by a Node B or a radio network controller (RNC).

Figure 5:
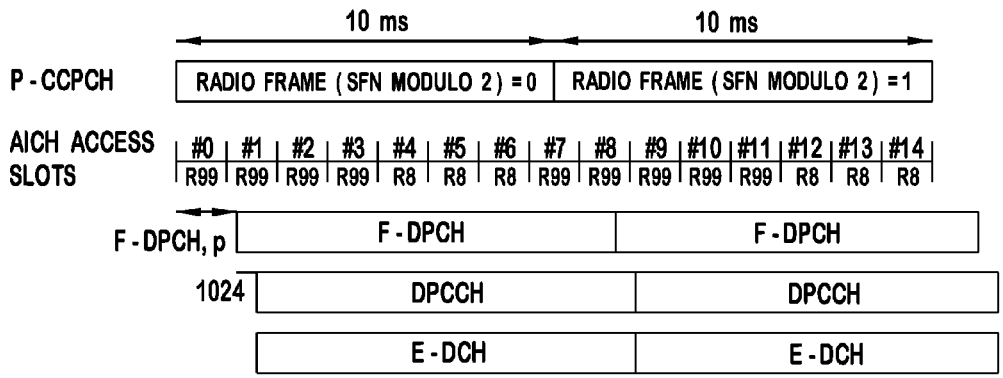
FIG. 5 shows an example case with 60% of the access slots are assigned for R99 RACH access and 40% of the access slots are assigned for R8 E-RACH access.

FIG. 5 shows an example case with 60% of the access slots are assigned for R99 RACH access and 40% of the access slots are assigned for R8 E-RACH access.

In accordance with a fourth embodiment, a second preamble may be transmitted to re-adjust the proper power level for shared E-DCH transmission if it has been too long since the last RACH preamble transmission. In this case, higher number of RACH preamble transmissions may result since those WTRUs in unfavorable RACH access slots would require second preamble transmissions to re-adjust the power level of shared E-DCH transmission.

In accordance with a fifth embodiment, the shared E-DCH transmission power level may be estimated based on CPICH measurement or any other reference channel measurement at the time of the RACH preamble and/or shared E-DCH transmissions.

In accordance with a sixth embodiment, the timing of the F-DPCH frame is set in a way that results in a short delay between the last RACH preamble transmission on the RACH access slot and its initial E-DCH transmission. This delay should be short enough to ensure that the transmission power level used for the last RACH preamble is still a good starting point for the E-DCH transmission, minimizing potential power synchronization issues and excessive uplink interference.

Conventionally, the F-DPCH timing offset ($\tau_{F\text{-}DPCH,p}$) is defined with respect to the P-CCPCH frame boundary. In accordance with the sixth embodiment, the F-DPCH timing offset that is allocated to the WTRU is defined with respect to either the start or end of the last RACH preamble transmission or reception plus optionally an additional offset, or the start or end of the last AICH transmission or reception plus optionally an additional offset. The F-DPCH timing offset may be pre-defined or signaled through higher layer signaling, (e.g., through the system information block (SIB)). Since the F-DPCH timing offset is relative to the timing of the last RACH preamble transmission or reception or AICH transmission or reception, the issue of having a potentially large delay between this last RACH preamble transmission and the E-DCH transmission disappears.

It is advantageous to have resources defined with different F-DPCH timing offsets as it allows multiple WTRUs to share the same F-DPCH channelization code. Alternatively, instead of defining a resource in terms of an F-DPCH timing offset, the F-DPCH timing offset relative to PRACH access slot transmission may be fixed to a pre-defined value for all resources, but resources for WTRUs may be defined in terms of a different F-DPCH slot format. Using a different F-DPCH slot format for different resources allows the Node B to allocate the same F-DPCH channelization code to multiple WTRUs with full flexibility even if the F-DPCH timing offset is pre-determined.

Alternatively, the network may broadcast an F-DPCH "relative" timing offset, (relative to the RACH transmission or reception, or AICH transmission or reception). This would allow multiple WTRUs to simultaneously share the same F-DPCH channelization code, while at the same time provide flexibility in selecting an F-DPCH "absolute" timing offset with respect to the P-CCPCH that minimizes the delay between the last RACH preamble transmission and the start of the E-DCH transmission. The network may broadcast the F-DPCH "relative" timing offset associated with each E-DCH resource via a system information block(s) (SIB). For a system with N radio slots per frame and K WTRUs sharing the same F-DPCH, each resource may be assigned a unique F-DPCH "relative" timing offset R_off=0 . . . K−1. The WTRU and the network may then have flexibility to select a slot number (S_num=1 . . . N) that would minimize the delay. Rules are specified for the selection of the slot number to guarantee agreement between the WTRU and the network, (e.g., the slot number S_num may be fixed in the standards). With the F-DPCH relative timing offset associated with the resource and the slot number pre-configured or selected by the WTRU and the Node B, the F-DPCH "absolute" timing offset may be computed by (S_num−1)×K+R_off.

Figure 6:
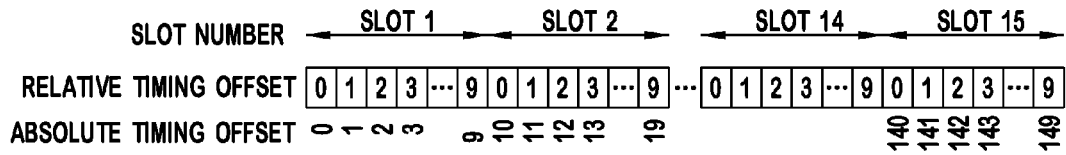
FIG. 6 shows relative and absolute timing offset.
Figure 7:
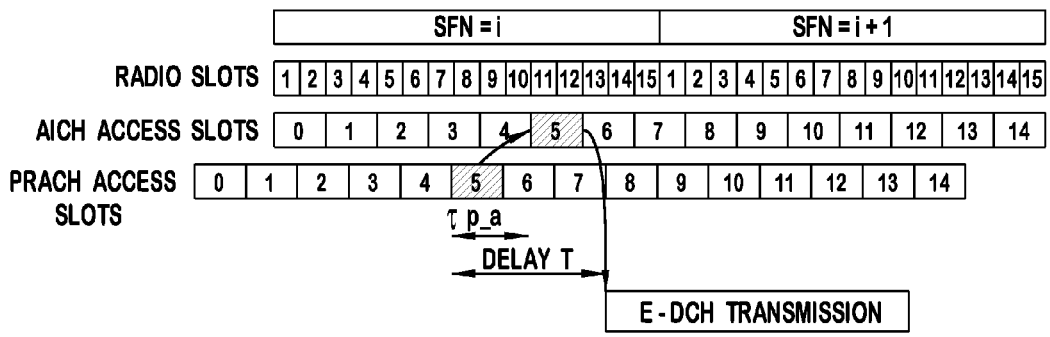
FIG. 7 shows an example scenario for E-DCH transmission.

FIG. 6 shows relative and absolute timing offset in an example case where N=15 and K=10. FIG. 7 shows an example scenario of E-DCH transmission. In FIG. 7, a successful RACH preamble has been transmitted in PRACH access slot 5, and the network responds with an ACK in AICH access slot 5. If E-DCH resources are available, they may be assigned to the WTRU. This resource assignment is associated with an F-DPCH "relative" timing offset. The WTRU and the network determine to begin E-DCH transmission on slot 14 based on a preconfigured rule. Selection of slot 14 may be based on a configured $\tau_{p\text{-}m}$ or some other standardized or network configured delay T, which may be broadcast, for example, through SIB.

Figure 8:
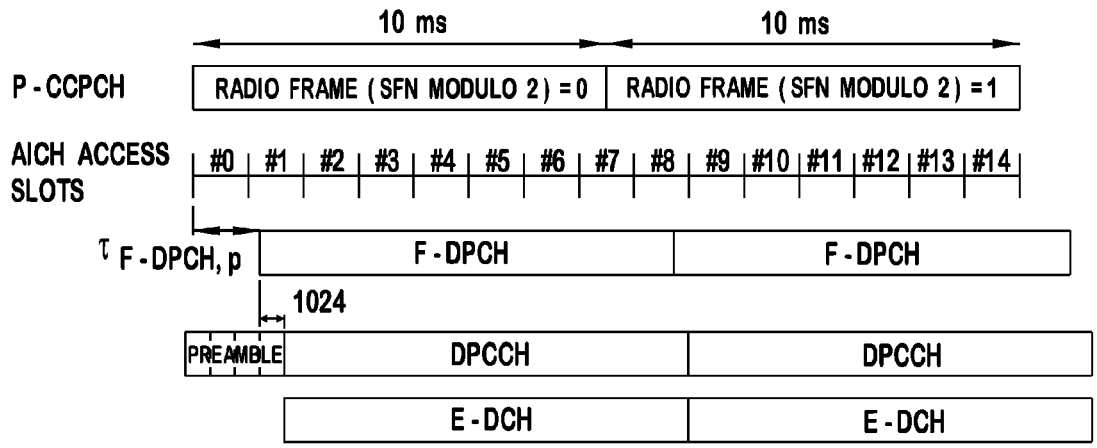
FIG. 8 shows four radio slots of DPCCH preamble transmission before E-DCH transmission.

A DPCCH power control preamble, (i.e., DPCCH-only transmission without E-DCH transmission), comprising a number of DPCCH slots may be transmitted for several radio slots before the first E-DCH transmission to help with uplink synchronization and stabilization of the power control loop. FIG. 8 shows four radio slots of DPCCH preamble transmission before E-DCH transmission. In previous releases of the 3GPP standards, the duration of the DPCCH preamble associated to synchronization procedure A is defined in terms of number of radio frames. In accordance with this embodiment, the DPCCH preamble duration and start and stop time may be defined in terms of radio slots. The duration of the DPCCH preamble may depend on the time difference between the last uplink RACH preamble transmission and the start of the DPCCH preamble. In this way, as the time difference gets larger the preamble transmission gets longer to stabilize the power control loop. The parameters for selection of the preamble duration and preamble start time may be signaled by a higher layer, or may be pre-configured and/or implicit.

Optionally, the initial DPCCH preamble power level may be adjusted in a similar manner to E-DCH power transmission power offset in accordance with the first embodiment. The initial DPCCH preamble power level may be adjusted based on the time difference between the last RACH preamble transmission to the time where uplink transmission starts (DPCCH or E-DCH transmission). This allows a protection against time variations in the channels that might potentially make the initial transmission fail. The parameters to select the amount of power offset may be signaled by a higher layer, or may be pre-configured and/or implicit.

The transmission of a DPCCH-only preamble may lead to difficulties associated to the start of the uplink scrambling code. The uplink scrambling code is a pseudo-random sequence with a period of one radio frame, (i.e., 10 ms). The start of the uplink scrambling is synchronized with the beginning of the E-DCH radio frame. Thus, in the case where the WTRU starts transmission of the DPCCH preamble before the start of the uplink radio frame, the WTRU and the Node B need to know where to start the scrambling sequence, which is a difficult task due to the very own nature of scrambling sequence generation.

In order to solve this problem, a common uplink scrambling code may be temporarily used for the duration of the DPCCH preamble and possibly the first few E-DCH transmission time intervals (TTIs) in the case of the E-DCH with 2 ms TTI. This common uplink scrambling may be preconfigured, signaled via a higher layer, or implicit. For instance, the common uplink scrambling code may be the same scrambling code as the one used by the WTRU for the last access preamble on the RACH. Since the WTRU knows the common uplink scrambling code in advance, the WTRU may start uplink transmission anywhere in the radio frame, essentially allowing early transmission of the DPCCH preamble. In addition, the use of the common scrambling code for DPCCH preamble allows for quick detection and synchronization of DPCCH preamble transmission. In such case, the DPCCH preamble duration would essentially depend on the time difference between the last RACH preamble transmission and the start of the E-DCH transmission. Optionally, an additional DPCCH preamble period may be defined after the start of the F-DPCH frame so that the Node B has sufficient time to synchronize with the new scrambling code. This period may be pre-defined or signaled by the network.

Figure 9:
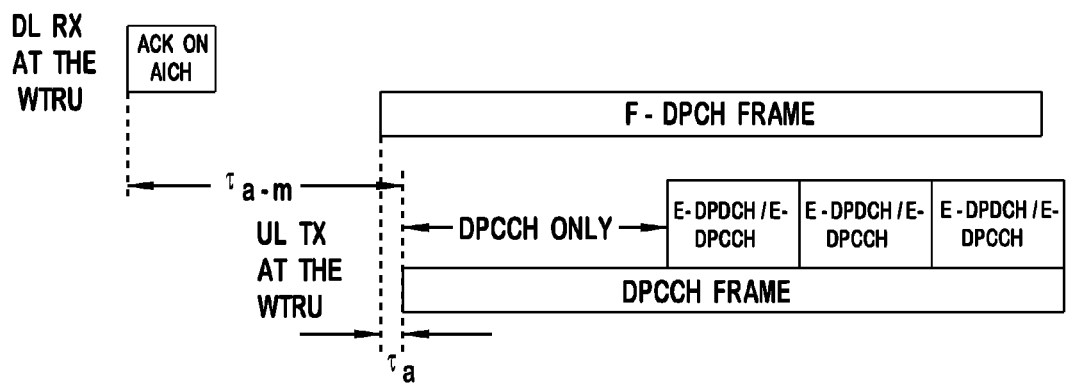
FIG. 9 shows transmission of DPCCH-only transmission after crossing the F-DPCH frame boundary.

Alternatively, the alignment of the F-DPCH frame for the E-DCH transmission in CELL_FACH may be made such that the DPCCH preamble (using the allocated uplink scrambling code) always starts after crossing at least one F-DPCH frame boundary after the WTRU gets its E-DCH resource assignment on the AICH/E-AICH. This may be achieved, for instance, by selecting the F-DPCH time offset based on the RACH access slot or the AICH access slot. FIG. 9 shows transmission of DPCCH-only transmission after crossing the F-DPCH frame boundary. In FIG. 9, the E-DCH transmission is off for the first N transmission time interval(s) (TTI(s)) and DPCCH-only transmission is transmitted for the first N TTI(s).

The conventional F-DPCH frame offset from the P-CCPCH frame timing, $\tau_{F-DPCH,p}$, is a multiple of 256 chips. $\tau_{F-DPCH,p}$ may be expressed as a sum of an integer number of radio slots, (i.e., multiple of 2,560 chips from the beginning of the P-CCPCH frame), and a radio slot fractional offset expressed as a multiple of 256 chips:

$$\tau_{F-DPCH,p} = L \times 2560 + k' \times 256, \quad \text{Equation (1)}$$

where L=0, 1, . . . , 14 and k'=0, 1, . . . , 9. The radio slot fractional offset allows using the same F-DPCH channelization code for several WTRUs (assuming the same F-DPCH slot format).

To make sure that the F-DPCH frame boundary arrives shortly after the E-DCH resource allocation on the AICH or E-AICH, the network may broadcast as part of the E-DCH shared resource only the part of the timing offset that determines when the transmit power control (TPC) commands are sent within the radio slot for a given F-DPCH channelization code, or equivalently the radio slot fractional offset (assuming a fixed F-DPCH slot format) or equivalently a combination of radio slot fractional offset and F-DPCH slot format. This information may be represented by k' in Equation (1). The part of the timing offset expressed in terms of integer number of radio slots (e.g., expressed by L in Equation (1)), includes an offset L' defined relative to the last RACH preamble sent by the WTRU (or equivalently an offset defined relative to the transmission of the AICH since there is a fixed timing relationship between the RACH and the AICH). This offset L' may be pre-configured by the standards or signaled by a higher layer, (e.g., as part of the SIBs). This allows the F-DPCH frame offset to be defined as close as possible to the start of the uplink transmission, while leaving all the F-DPCH channelization code allocation flexibility at the Node B. The resulting absolute F-DPCH frame offset (L) relative to the P-CCPCH can then be expressed as the sum of (1) the offset from the P-CCPCH frame determined by the timing of the last transmitted RACH access slot (or the AICH access slot), (i.e., the number of RACH or AICH access slots from the P-CCPCH frame before transmission of the RACH preamble or reception of the AICH), (2) the offset (L') relative to that last RACH preamble (or the received AICH), and (3) the signaled offset (k') within the radio slot (in multiple of 256 chips). Note that the F-DPCH frame offset is always positive and relative to the closest P-CCPCH frame. Thus, truncation may be applied if necessary.

An additional benefit of broadcasting the relative timing offset within the radio slot instead of the absolute timing offset with respect to the P-CCPCH for each common E-DCH resource is that the former requires much less information than the latter. Indeed, signaling one of 10 offsets per radio slot requires 4 bits while signaling one of 150 offsets (10 offsets per slot, 15 slots per radio frame) would require 8 bits. This may represent a significant advantage given that this information is broadcast on the SIBs for each of the common E-DCH resource.

Figure 10:
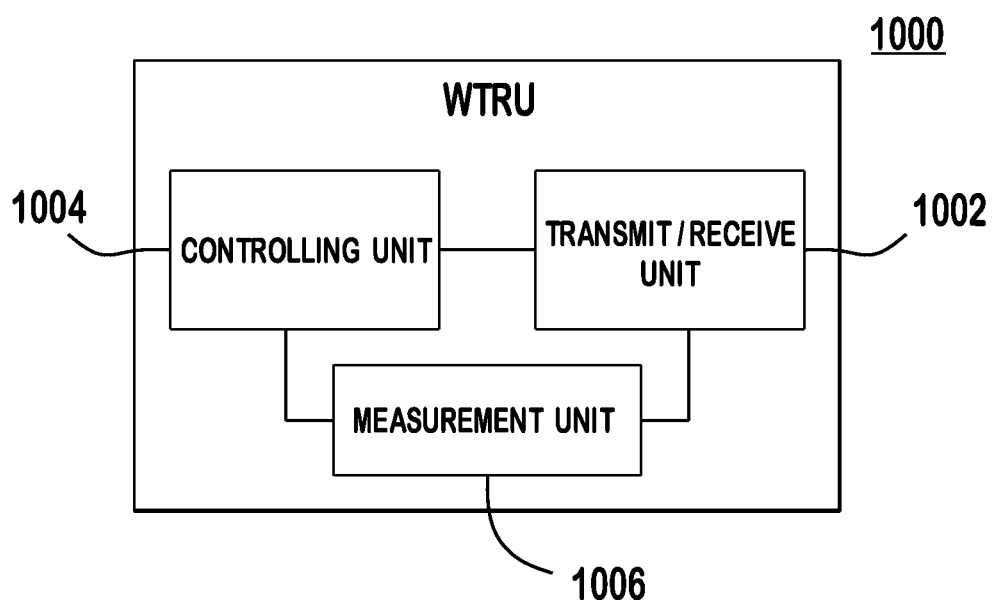
FIG. 10 is a block diagram of an example WTRU.

FIG. 10 is a block diagram of an example WTRU 1000. The WTRU 1000 includes a transmit/receive unit 1002, a controlling unit 1004, and a measurement unit 1006. The transmit/receive unit 1002 is configured to transmit an RACH preamble in a randomly selected RACH access slot, receive an ACK or NACK indicator via an AICH in response to the RACH preamble, and transmit an E-RACH message via an E-DCH. The controller 1004 is configured to perform control functions for radio link synchronization and power control in accordance with the first through seventh embodiments disclosed above including adjustment of a power offset between a transmit power of the acknowledged RACH preamble and a transmit power of a control part of the E-RACH message based on a time to a next E-DCH frame boundary since transmission of the acknowledged RACH preamble, selection of the RACH access slot in a way assuring that the E-DCH transmission is near an uplink frame boundary, initiating a transmission of another RACH preamble to determine a transmit power for an E-RACH message if a time elapsed since the acknowledged RACH preamble transmission is longer than a predetermined threshold, determining a transmit power for the E-RACH message transmission based on the CPICH measurement, determining an F-DPCH timing offset with respect to one of the acknowledged RACH preamble transmission and the AICH reception in response to the RACH preamble, controlling transmission of the DPCCH power control preamble, and the like. The measurement unit 906 is configured to perform measurements, such as CPICH measurements.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for radio link synchronization and power control in CELL_FACH state, the method comprising:
   transmitting a system information block (SIB) including an offset value, value, wherein the SIB includes an indicator of a subset of access slots associated with a random access channel (RACH) preamble;
   receiving the RACH preamble in at least one of the subset of access slots;
   transmitting an acquisition indicator in response to the RACH preamble;
   transmitting a fractional dedicated physical channel (F-DPCH) according to an F-DPCH time, the F-DPCH time being based on a relative F-DPCH timing offset parameter and timing of an acquisition indicator channel (AICH) access slot including the acquisition indicator, wherein the relative F-DPCH timing offset parameter is 256 chips multiplied by the offset value; and
   receiving a dedicated physical control channel (DPCCH) according to a DPCCH time, the DPCCH time and the F-DPCH time being offset by a predetermined offset.

2. The method of claim 1 wherein the DPCCH time is calculated by adding the predetermined offset to the F-DPCH time.

3. The method of claim 1 wherein the DPCCH time is calculated by adding the relative F-DPCH timing offset parameter to a beginning of the AICH access slot including the acquisition indicator, and the F-DPCH time is calculated by subtracting the predetermined offset from the DPCCH time.

4. The method of claim 1 wherein the DPCCH begins with a power control preamble.

5. The method of claim 1 wherein the RACH preamble is associated with a randomly selected signature.

6. The method of claim 5 wherein the signature is randomly selected from a set of up to 16 signatures.

7. The method of claim 1, further comprising:
   receiving a RACH message via an enhanced dedicated channel (E-DCH).

8. The method of claim 7 wherein the start of an E-DCH frame occurs at a slot that minimizes a delay between the RACH preamble reception and the RACH message reception.

9. The method of claim 1 wherein the acquisition indicator indicates an index to an enhanced dedicated channel (E-DCH) resource.

10. The method of claim 1 wherein the predetermined offset is 1024 chips.

11. The method of claim 1 wherein the RACH preamble is associated with in a randomly selected access slot.

12. The method of claim 1 wherein the acquisition indicator indicates an acknowledgement.

13. A Node B for radio link synchronization and power control in CELL_FACH state, the Node B comprising:
   a transmit/receive unit configured to transmit a system information block (SIB) including an offset value, wherein the SIB includes an indicator of a subset of access slots associated with a random access channel (RACH) preamble, receive the RACH preamble, wherein the RACH preamble is received in at least one of the subset of access slots, transmit an acquisition indicator in response to the RACH preamble, transmit a fractional dedicated physical channel (F-DPCH) according to an F-DPCH time, the F-DPCH time being based on a relative F-DPCH timing offset parameter and timing of an acquisition indicator channel (AICH) access slot including the acquisition indicator, wherein the relative F-DPCH timing offset parameter is 256 chips multiplied by the offset value, and receive a dedicated physical control channel (DPCCH) according to a DPCCH time, the DPCCH time and the F-DPCH time being offset by a predetermined offset.

14. The Node B of claim 13 wherein the DPCCH time is calculated by adding the predetermined offset to the F-DPCH time.

15. The Node B of claim 13 wherein the DPCCH time is calculated by adding the relative F-DPCH timing offset parameter to a beginning of the AICH access slot including the acquisition indicator, and the F-DPCH time is calculated by subtracting the predetermined offset from the DPCCH time.

16. The Node B of claim 13 wherein the DPCCH begins with a power control preamble.

17. The Node B of claim 13 wherein the RACH preamble is associated with a randomly selected signature.

18. The Node B of claim 17 wherein the signature is randomly selected from a set of up to 16 signatures.

19. The Node B of claim 13, further comprising the transmit/receive unit being further configured to receive a RACH message via an enhanced dedicated channel (E-DCH).

20. The Node B of claim 19 wherein the start of an E-DCH frame occurs at a slot that minimizes a delay between the RACH preamble reception and the RACH message reception.

21. The Node B of claim 13 wherein the acquisition indicator indicates an index to an enhanced dedicated channel (E-DCH) resource.

22. The Node B of claim 13 wherein the predetermined offset is 1024 chips.

23. The Node B of claim 13 wherein the RACH preamble is associated with in a randomly selected access slot.

24. The Node B of claim 13 wherein the acquisition indicator indicates an acknowledgement.

* * * * *